(12) United States Patent
Kondo

(10) Patent No.: US 6,595,184 B1
(45) Date of Patent: Jul. 22, 2003

(54) INTAKE CONTROL SYSTEM OF MULTI-CYLINDER ENGINE

(75) Inventor: Jiro Kondo, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/321,433

(22) Filed: Dec. 18, 2002

(30) Foreign Application Priority Data

Dec. 27, 2001 (JP) ........................................ 2001-397445

(51) Int. Cl.$^7$ ................................................ F02D 9/08
(52) U.S. Cl. ...................... 123/336; 123/361; 123/399; 123/339.25
(58) Field of Search ................. 123/399, 337, 123/339.14, 336, 328, 339.1, 339.25, 339.27, 361

(56) References Cited

U.S. PATENT DOCUMENTS

| | | | | |
|---|---|---|---|---|
| 4,827,884 A | * | 5/1989 | Cook ........................ | 123/336 |
| 4,850,322 A | * | 7/1989 | Uthoff et al. ............... | 123/399 |
| 5,003,948 A | * | 4/1991 | Churchill et al. ........... | 123/352 |
| 5,014,667 A | * | 5/1991 | Meyer ....................... | 123/399 |
| 5,107,813 A | * | 4/1992 | Inoue et al. .......... | 123/406.22 |
| 5,996,554 A | * | 12/1999 | Tojo et al. .................. | 123/399 |
| 6,067,957 A | * | 5/2000 | Motose et al. .............. | 123/305 |
| 6,067,961 A | * | 5/2000 | Kato .......................... | 123/399 |
| 6,164,623 A | * | 12/2000 | Ito et al. .................... | 251/305 |
| 6,239,562 B1 | * | 5/2001 | Turner ....................... | 318/139 |
| 6,247,447 B1 | * | 6/2001 | Muraji ....................... | 123/399 |
| 6,332,451 B1 | * | 12/2001 | Sato et al. .................. | 123/399 |
| 6,390,061 B1 | * | 5/2002 | Melville et al. ............ | 123/353 |
| 6,457,465 B2 | * | 10/2002 | Lee ............................ | 123/643 |
| 6,516,776 B1 | * | 2/2003 | Kai et al. ................... | 123/337 |
| 6,520,147 B1 | * | 2/2003 | Kanno ................... | 123/339.23 |
| 2001/0039940 A1 | * | 11/2001 | Kuretake .................... | 123/399 |

FOREIGN PATENT DOCUMENTS

| | | |
|---|---|---|
| JP | A-4-292551 | 10/1992 |
| JP | A-5-340275 | 10/1992 |
| JP | A-11-36960 | 2/1999 |

* cited by examiner

*Primary Examiner*—Hieu T. Vo
*Assistant Examiner*—Hai H. Huynh
(74) *Attorney, Agent, or Firm*—Nixon & Vanderhye P.C.

(57) ABSTRACT

An intake control system has intake control valves disposed in intake passages of cylinders of a multi-cylinder internal combustion engine. ECU controls the opening degrees of the intake control valves of the respective cylinders based on signals from sensors to converge rotation speed of the engine in a lower limit rotation speed above which the engine does not stall during an idling operation of the engine.

3 Claims, 3 Drawing Sheets

INTAKE CONTROL SYSTEM OF MULTI-CYLINDER ENGINE

CROSS REFERENCE TO RELATED APPLICATION

This application is based on and incorporates herein by reference Japanese Patent Application No. 2001-397445 filed on Dec. 27, 2001.

BACKGROUND OF THE INVENTION

1. Field of the Invention

The present invention relates to an intake control system of a multi-cylinder internal combustion engine, the intake control system being capable of controlling quantity of intake air for each cylinder by controlling opening and closing of intake control valves disposed in respective intake passages of the engine. More specifically, the present invention relates to an intake control system that controls the intake quantity for each cylinder in order to regulate idling rotation speed during an idling operation of an internal combustion engine.

2. Description of Related Art

Conventionally, a known intake control system has intake control valves disposed in intake passages of an internal combustion engine and controls quantity of intake air for each cylinder by controlling opening and closing of each intake control valve in accordance with rotation of the engine, besides a throttle valve disposed in the engine.

In such an intake control system, the intake control valves are controlled open or close by actuators respectively and independently. Therefore, it is possible to prevent back flow of the intake air, which occurs in an intake stroke when an engine rotation speed is in a low speed range, by controlling the opening and closing timing of the intake control valves in accordance with rotation speed or load of the engine. As a result, an output of the engine is improved. It is also possible to reduce a pumping loss, which increases when the engine is operated under a partial load especially when the engine is idling, by controlling the opening and closing timing of the intake control valves in accordance with the rotation speed or the load of the engine. Thus, fuel consumption is reduced, as is commonly known. When the engine is operated under a partial load, especially when the engine is idling, intake air is drawn through one port alone. Therefore, swirls or tumbles are generated in the cylinder and atomization of fuel is improved. Accordingly, the fuel is mixed with air efficiently, and fuel combustion is improved.

Conventionally, a 90-degree rotating type rotary solenoid actuator, an R/S actuator, is used as an actuator that drives the intake control valve open or close. The R/S actuator holds the intake control valve at a neutral position where an intake passage is half opened, when the R/S actuator is not energized. When the R/S actuator is energized, the R/S actuator drives the intake control valve from the neutral position in a direction to open or to close the intake control valve in accordance with strength and direction of the energization.

In such a case in which the intake control system employs the R/S actuator that holds the intake control valve at the neutral position when the R/S actuator is not energized, safety is ensured because the engine is capable of operating without closing the intake passage even if the R/S actuator is not energized because of a breakdown and the like. In addition, the direction of opening and closing the intake control valve is switched by altering the direction of the energization. Therefore, the intake control valve is driven from a full opening position to a full closing position quickly, and vice versa.

However, the conventional intake control valve explained above has no means for detecting its valve opening degree, and therefore, the valve opening degree cannot be controlled precisely. The conventional intake control valve is regulated basically in only three positions, a full opening position, a neutral position and a full closing position. In addition to the intake control valves, an electronic throttle valve is disposed in upstream of a surge tank and is controlled by an electronic control unit (ECU). The ECU regulates the opening degree of the electronic throttle valve based on the signal of the rotation speed of the engine so that the rotation speed is generally constant even during the idling operation of the engine.

Thus, the conventional intake control system is not constructed to control the intake quantity for each cylinder. Therefore, the intake quantity varies among the cylinders, and therefore, the rotation speed of the engine fluctuates as shown in FIG. 5. In FIG. 5, the axis NE represents the rotation speed of the engine and the line $R_{LL}$ represents the lower limit rotation speed above which the engine is operable and the engine does not stall. The idling rotation speed of the engine is set based on an idling rotation speed of a cylinder having the lowest idling rotation speed, in order to prevent an engine stall. Therefore, the idling rotation speed is slightly too fast for the other cylinders. As a result, the fuel consumption is increased in the other cylinders.

SUMMARY OF THE INVENTION

It is therefore an object of the present invention to provide an intake control system of a multi-cylinder internal combustion engine, the intake control system being capable of reducing fuel consumption during an idling operation of the engine.

According to an embodiment of the present invention, an intake control system has intake control valves disposed in respective intake passages of cylinders, rotary solenoid actuators for respectively driving the intake control valves open or close, opening degree sensors for detecting opening degree of the intake control valves and an ECU. The ECU controls valve opening degree of the intake control valve for each cylinder based on signals from a crank angle sensor, a cylinder determination sensor, the opening degree sensor and the like. The intake control system regulates the valve opening degree of the intake control valves for each cylinder to converge an idling rotation speed of the engine to a lower limit rotation speed above which the engine is operable and the engine does not stall. Thus, the rotation speeds of the entire cylinders are converged to the lower limit rotation speed during the idling operation. As a result, the fuel consumption during the idling operation is reduced.

DETAILED DESCRIPTION OF THE REFERRED EMBODIMENT

Figure 1:
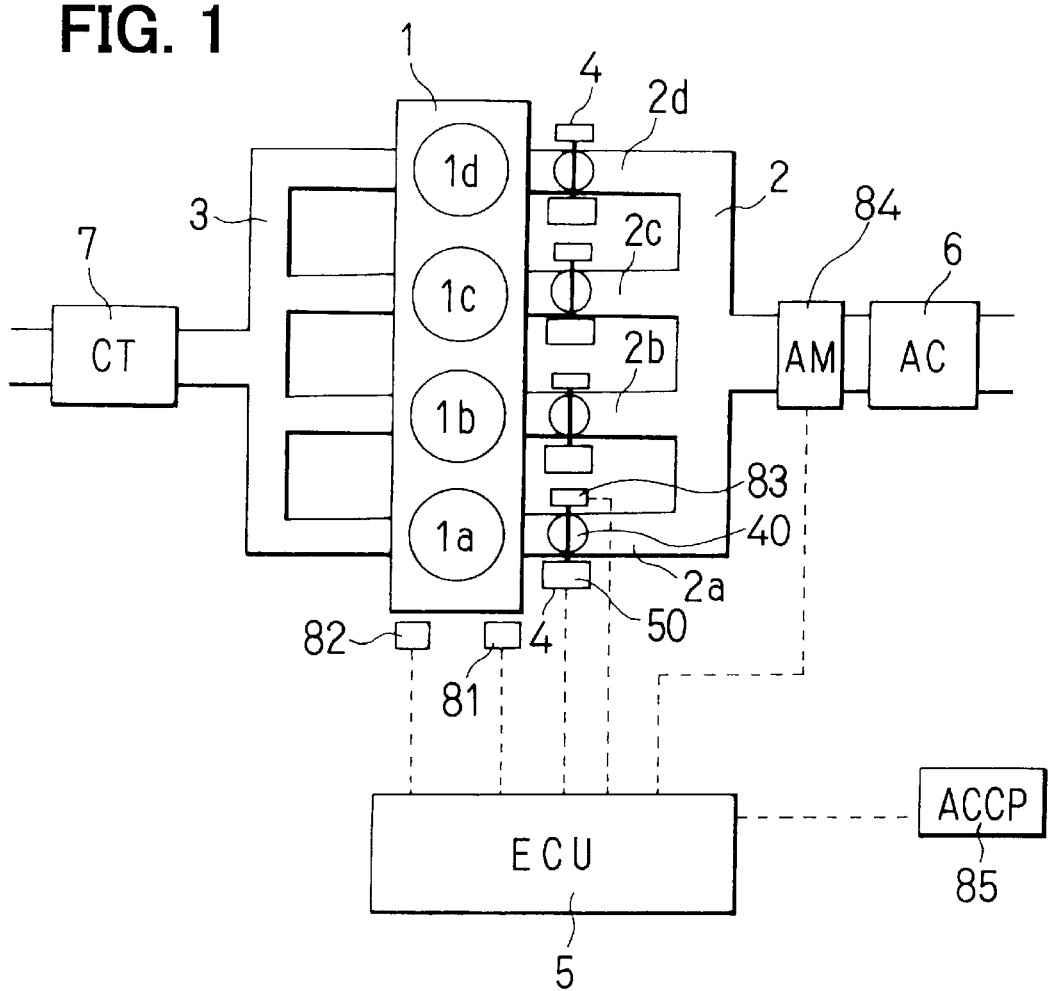
FIG. 1 is a diagram showing a system configuration of an internal combustion engine employing an intake control system according to an embodiment of the present invention.

As shown in FIG. 1, a system of an internal combustion engine 1 according to an embodiment of the present invention is constructed with a four-cylinder internal combustion engine 1, an intake passage 2 and an exhaust passage 3 of the engine 1, intake control devices 4 disposed in respective intake manifolds 2a, 2b, 2c, 2d, which are connected with respective cylinders, of the intake passage 2, an electronic control unit (ECU) 5 that controls the intake control devices 4, and the like.

The engine 1 has four cylinders 1a, 1b, 1c, 1d. Each cylinder 1a, 1b, 1c, 1d has an intake valve and an exhaust valve that are opened and closed by high-speed cams having profiles adapted for high-speed. The intake control device 4 is disposed in each intake manifold 2a, 2b, 2c, 2d in the upstream of the intake valve of each cylinder 1a, 1b, 1c, 1d. An air cleaner (AC) 6 is disposed in the intake passage 2 in the upstream of the intake manifolds 2a, 2b, 2c, 2d. The intake control system according to the embodiment has no throttle valve, which is disposed in the upstream of a surge tank and is opened and closed by accelerator operation by a driver or an ECU in the conventional intake control system. A catalyst (CT) 7 is disposed in the exhaust passage 3 in the downstream of the exhaust valves of the cylinders 1a, 1b, 1c, 1d.

The engine 1 also has a crank angle sensor 81, a cylinder determination sensor 82, opening degree sensors 83, an air flow meter (AM) 84, an accelerator position sensor (ACCP) 85 and the like as sensors to detect operating conditions of the engine 1. The crank angle sensor 81 detects a crank speed, or an engine rotation speed NE. The cylinder determination sensor 82 disposed on the camshaft outputs a pulse signal when a piston of each cylinder 1a, 1b, 1c, 1d is at a top dead center (TDC). The opening degree sensor 83 detects opening degree of an intake control valve 40 of the intake control device 4. The air flow meter 84 detects quantity of entire intake air drawn by the engine 1. The accelerator position sensor 85 detects depressed degree of an accelerator pedal. Detection signals from the respective sensors are outputted to the ECU 5.

The ECU 5 is constructed as a calculation circuit with CPU, ROM, RAM and the like. The ECU 5 is connected with an input and output part through a common bus and performs input and output with the exterior. The detection signals from the respective sensors are inputted to the ECU 5, and the ECU 5 outputs control signals to rotary solenoid actuators 50, R/S actuators, of the intake control devices 4.

Figure 2:
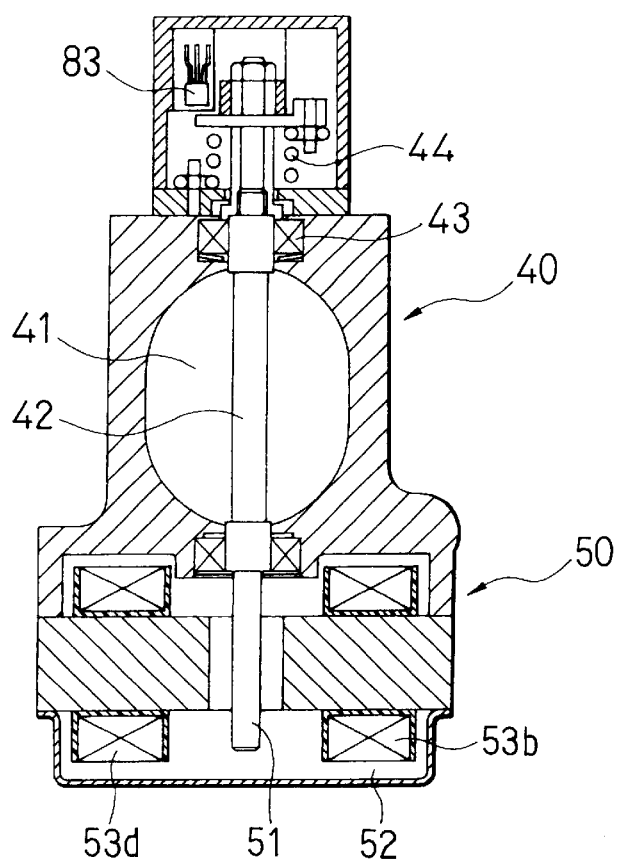
FIG. 2 is a longitudinal sectional view showing an intake control device according to the embodiment of the present invention.

As shown in FIG. 2, the intake control device 4 is constructed with the intake control valve 40, the R/S actuator 50 and the like. The intake control valve 40 has a butterfly-shaped circular valve plate 41, a valve body, disposed in each intake manifold 2a, 2b, 2c, 2d. The circular valve plate 41 is connected with a support shaft 42 and is held rotatably. The circular valve plate 41 rotates around the axis of the support shaft 42, retaining an extremely narrow clearance with the inner surface of each manifold 2a, 2b, 2c, 2d, without contacting the inner surface. The first end of the support shaft 42 is held by each intake manifold 2a, 2b, 2c, 2d through a bearing 43, and the second end thereof is connected with the R/S actuator 50.

A spring 44 is connected with the first end of the support shaft 42. The spring 44 holds the circular valve plate 41 at a neutral position, a half opening position, when the R/S actuator 50 is not energized. The intake control valve 40 further includes the opening degree sensor 83 that detects the opening degree of the circular valve plate 41.

Figure 3:
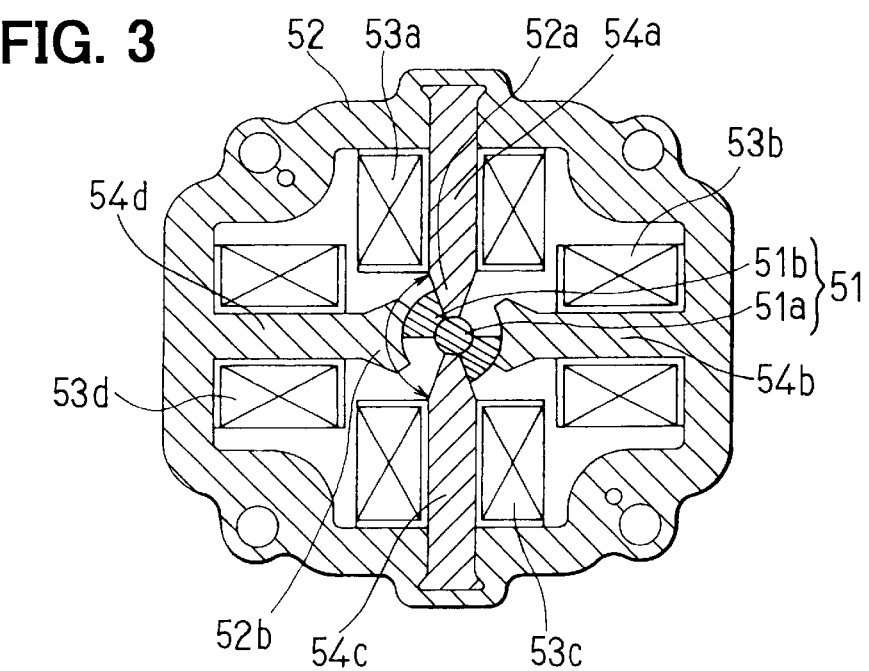
FIG. 3 is a sectional view showing a rotary solenoid actuator of the intake control device according to the embodiment of the present invention.

The R/S actuator 50 has a rotor 51 and a stator 52 that is made of a ferromagnetic material. The rotor 51 is connected with the support shaft 42. As shown in FIG. 3, the rotor 51 is integrally constructed with a solid rod-shaped part 51a and two fan-shaped parts 51b. The fan-shaped parts 51b are made of a ferromagnetic material and have fan-shaped cross-sections. The fan-shaped parts 51b are disposed on the outer peripheral surface of the rod-shaped part 51a in a symmetrical manner across the axial center of the rod-shaped part 51a and extends along the rod-shaped part 51a in the axial direction. The stator 52 has a housing part and four arms 54a, 54b, 54c, 54d formed on the inner surface of the housing part toward the axis of the rotor 51. The four arms 54a, 54b, 54c, 54d are disposed in four radial directions from the axis of the rotor 51 in an interval of an angle of generally 90 degrees. Four electromagnetic coils 53a, 53b, 53c, 53d are wound around the four arms 54a, 54b, 54c, 54d respectively in that order. Front ends of the arms 54a, 54c, which are disposed opposite to each other across the rotor 51, are tapered. Thus, a pair of projecting parts 52a are formed on the front ends of the arms 54a, 54c. On the other hand, front ends of the arms 54b, 54d, which are disposed opposite to each other across the rotor 51, are formed with a pair of extending parts 52b. The head of the extending part 52b is formed with a concave arc-shaped surface having a shape corresponding to the convex arc-shape of the fan-shaped part 51b.

The intake control valve 40 is closed fully when one side of the first fan-shaped part 51b contacts a side of the projecting part 52a of the arm 54c in a circumferential direction as shown in FIG. 3. On the other hand, the intake control valve 40 is opened fully when the other side of the first fan-shaped part 51b contacts a side of the projecting part 52a of the arm 54a in the circumferential direction. Thus, the rotor 51 rotates between the projecting parts 52a in a range of generally 90 degrees, which is determined by the projecting parts 52a and the fan-shaped parts 51b.

The R/S actuator 50 is operated as a holding force generating means for holding the intake control valve 40 at the full opening position, the full closing position and a partial opening position therebetween. The spring 44 returns the intake control valve 40 to the neutral position, improving the response. The opening degree sensor 83 is used when the opening degree of the intake control valve 40 is controlled. The opening degree of the intake control valve 40 is controlled by changing the intensity of the current flowing through the electromagnetic coils, wherein the current is controlled in a feed back control with the signals from the opening degree sensor 83. The opening degree of the intake control valve 40 is controlled especially when the intake control valve 40 needs to be held with a partial opening, for instance, when the engine 1 is idling.

Intake control of the internal combustion engine 1 during the idling operation will be explained based on FIGS. 1 and 4. The intake control system drives each intake control valve 40 open or close in order to control the quantity of the intake air drawn into each cylinder 1a, 1b, 1c, 1d. During the idling operation of the engine 1, the intake control system controls the opening degree of each intake control valve 4 while the intake control valve 40 is open as explained below.

First, the ECU 5 reduces variation in the rotation speeds among the cylinders 1a, 1b, 1c, 1d. The ECU 5 calculates instantaneous values of the rotation speed, the crank speed, of the engine 1 continuously based on the signal from the crank angle sensor 81 during the idling operation of the engine 1. Meanwhile, the ECU 5 calculates the variation in the rotation speeds among the cylinders 1a, 1b, 1c, 1d by relating the calculated rotation speed of the engine 1 with the signals outputted by the cylinder determination sensor 82. The ECU 5 calculates an average of the rotation speeds of the respective cylinders 1a, 1b, 1c, 1d and controls the intake control devices 4 so that the rotation speeds of the cylinders 1a, 1b, 1c, 1d converge to the averaged rotation speed. More specifically, the ECU 5 outputs a signal for decreasing the valve opening to the intake control valve 40 of the cylinder having a slightly higher average rotation speed than other cylinders. On the other hand, the ECU 5 outputs a signal for increasing the valve opening degree to the intake control valve 40 of the cylinder having a slightly lower average rotation speed than other cylinders. Thus, the rotation speeds of the entire cylinders 1a, 1b, 1c, 1d are converged to the averaged rotation speed and the variation in the rotation speeds is reduced.

Figure 4:
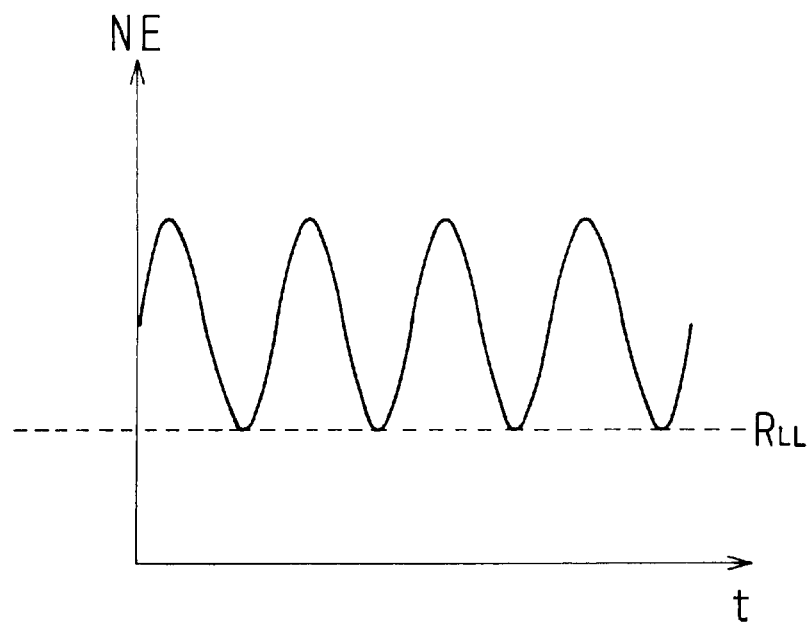
FIG. 4 is a drawing showing a waveform of an engine rotation speed regulated under an independent control of the embodiment of the present invention.
Figure 5:
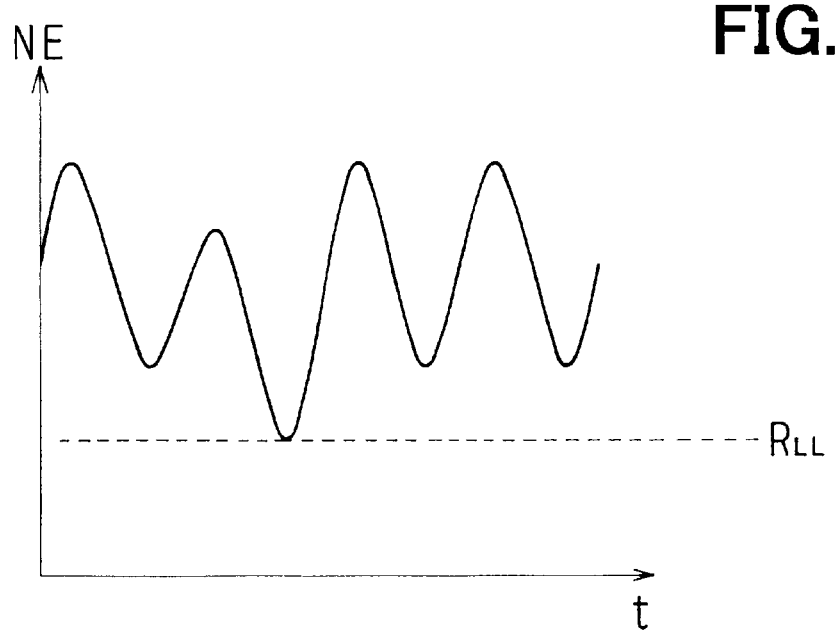
FIG. 5 is a drawing showing a waveform of an engine rotation speed without independent control of the embodiment of the present invention.

Next, the ECU 5 outputs signals to regulate the opening degrees of the entire intake control valves to change the averaged rotation speed of the cylinders 1a, 1b, 1c, 1d to the lower limit rotation speed above which the engine 1 is operable and the engine 1 does not stall, as shown in FIG. 4. In FIG. 4, the axis NE represents the rotation speed of the engine 1 and the line $R_{LL}$ represents the lower limit rotation speed above which the engine 1 is operable and the engine 1 does not stall. In this case, the signal from the opening degree sensor 83 of each intake control valve 40 is feedback-controlled in order to regulate the opening degree of the intake control valve 40 precisely. As a result, the rotation speeds of the entire cylinders are equally set at the lower limit rotation speed.

Thus, the intake control system reduces the rotation speeds, the crank speeds, of the entire cylinders 1a, 1b, 1c, 1d to the extreme lower limit rotation speed above which the engine 1 does not stall during the idling operation of the engine 1. Accordingly, excessive fuel is not consumed and the fuel consumption is reduced. Meanwhile, the vibration of the engine 1 is reduced because the variation in the rotation speeds among the respective cylinders 1a, 1b, 1c, 1d is reduced.

In the embodiment, the variation in the rotation speeds among the respective cylinders 1a, 1b, 1c, 1d is reduced by averaging the rotation speeds, and after that, the averaged rotation speed is converged to the lower limit rotation speed above which the engine 1 does not stall. Alternatively, the reduction of the variation in the rotation speeds and the converging of the averaged rotation speed to the lower limit rotation speed may be performed at the same time. In that case, the rotation speeds of the cylinders 1a, 1b, 1c, 1d are converged to the lower limit rotation speed respectively, for instance.

The present invention should not be limited to the disclosed embodiments, but may be implemented in many other ways without departing from the spirit of the invention.

What is claimed is:

1. An intake control system of a multi-cylinder internal combustion engine, the intake control system comprising:
   a plurality of intake control valves disposed in intake passages of the respective cylinders of the engine;
   a plurality of rotary solenoid actuators, wherein each rotary solenoid actuator holds the intake control valve at a neutral position where the intake passage is half-opened when the rotary solenoid actuator is not energized and drives the intake control valve open or close in accordance with a direction of energization when the rotary solenoid actuator is energized;
   a plurality of opening degree sensors for detecting opening degrees of the respective intake control valves;
   a crank angle sensor for detecting rotation speed of the engine; and
   a controller that regulates the opening degree of each intake control valve by driving each rotary solenoid actuator based on signals inputted from the opening degree sensors and the crank angle sensor in order to converge the rotation speed of the engine to a lower limit rotation speed above which the engine is operable during an idling operation of the engine.

2. The intake control system as in claim 1, further comprising:
   a cylinder determination sensor for detecting phases of the respective cylinders,
   wherein the controller calculates fluctuation in the rotation speed based on information outputted by the crank angle sensor, determines variation in the rotation speeds among the cylinders by relating the fluctuation in the rotation speed of the engine with the phases of the cylinders detected by the cylinder determination sensor, and regulates the opening degree of each intake control valve to reduce the variation.

3. The intake control system as in claim 1, wherein the controller regulates the opening degree of the intake control valve in a feedback-control manner.

* * * * *